Nov. 7, 1939.  E. RAMSAY  2,179,100
ROLLING CAR DUMP
Filed Nov. 12, 1937    4 Sheets-Sheet 2

Fig. 2

INVENTOR
ERSKINE RAMSAY
BY
ATTORNEYS

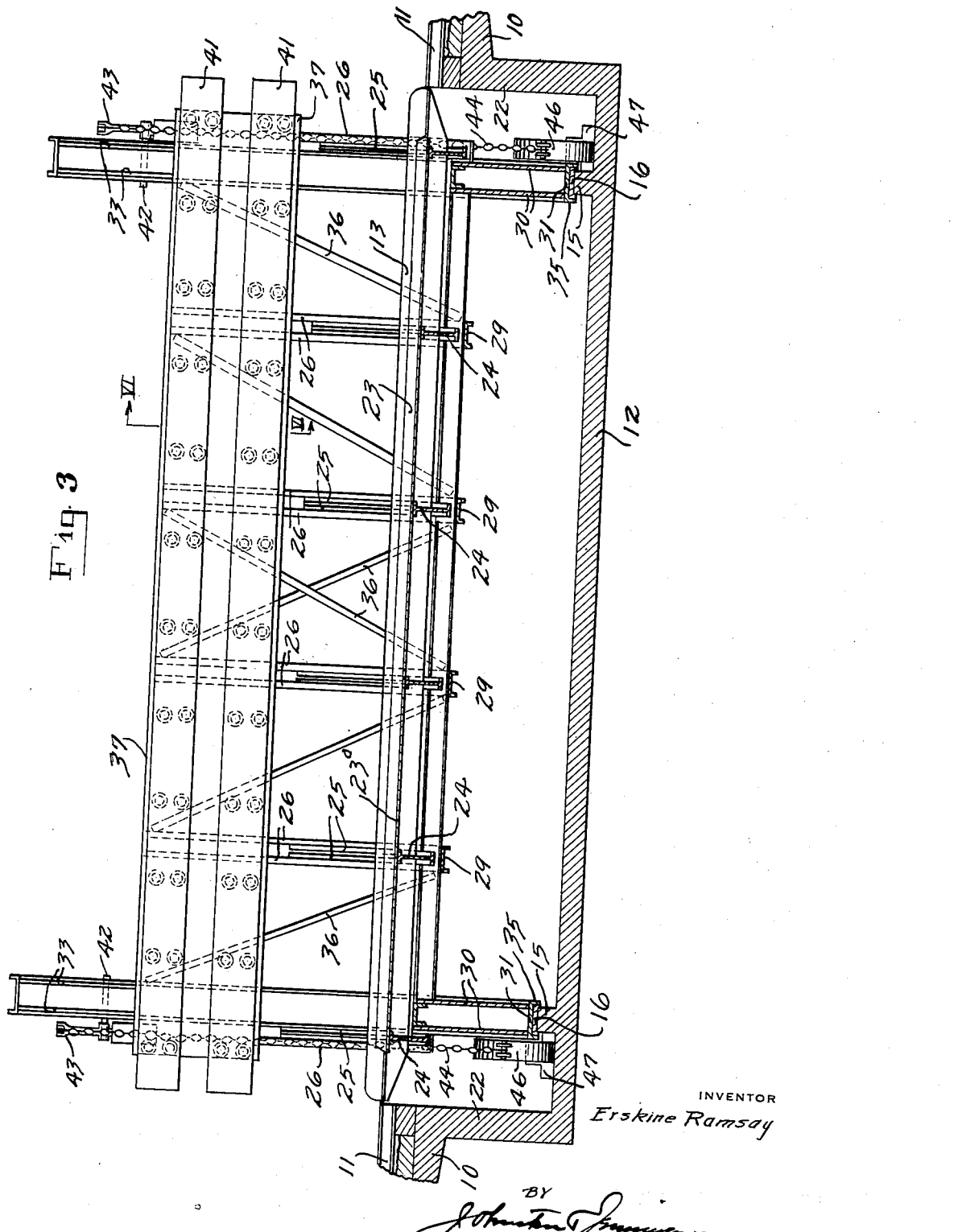

Nov. 7, 1939.  E. RAMSAY  2,179,100
ROLLING CAR DUMP
Filed Nov. 12, 1937 4 Sheets-Sheet 4

Inventor
ERSKINE RAMSAY
By Johnston & Jennings
Attorneys

Patented Nov. 7, 1939

2,179,100

UNITED STATES PATENT OFFICE 2,179,100

ROLLING CAR DUMP

Erskine Ramsay, Birmingham, Ala.

Application November 12, 1937, Serial No. 174,152

6 Claims. (Cl. 214—51)

My invention relates to a rotary car dump of the rolling type, adapted more particularly, but not exclusively, for dumping railway cars.

My invention relates to that class of dump in which a track section is suitably mounted in riding rings, or ring segments, adapted by rack engagement with a transverse cogged track, to roll away from the car receiving position and invert the car to dump its contents, suitable means being provided for controlling the rolling movements back and forth of the dump.

One distinctive feature of my invention consists in mounting the car track section within the dump on a swinging cradle suitably suspended from the dump frame and associated with longitudinal spring bumper bars which form yieldable stops for the car as it shifts laterally with the cradle responsive to the rolling motion of the dump. This shift bodily of the cradle and car assists in the unbalancing of the dump to accelerate its dumping operation.

My invention further consists in novel and effective means which automatically move into position to engage and positively grip the car so as to hold it in position in the dump while it is being inverted and which automatically release the dumped car.

My invention further contemplates a multiple chain control for the dump wherein the several chains employed are maintained under tension by a common floating idler roller and are controlled by sprockets on a common shaft to which a worm drive is connected, whereby all of the chains are subject to a common drive and common brake control through the worm gear drive in the manipulation of the dump.

My invention further contemplates so connecting the dump operating chains to car hold-down members that, responsive to the rolling motion of the dump, such chains will automatically apply hold-down members to positively engage and hold the car in position in the dump until it approaches initial position, when they will act to disengage the hold-down members and release the car to be moved out of the dump.

My invention further contemplates the provision of pivoted counterweights connected to hold-down elements and adapted to cause them to engage the side of the car resting against the spring bumpers during the dumping operation and to automatically release them when the car resumes initial position.

My invention further comprises the novel details of construction and arrangements of parts which are hereinafter more particularly described and claimed, and which are illustrated in the accompanying drawings, in which:

Fig. 2 is a sectional view of Fig. 1 taken on the line II—II.

Fig. 3 is a view taken in vertical section on the line III—III of Fig. 1.

Similar numerals refer to similar parts throughout the drawings.

Figure 1:
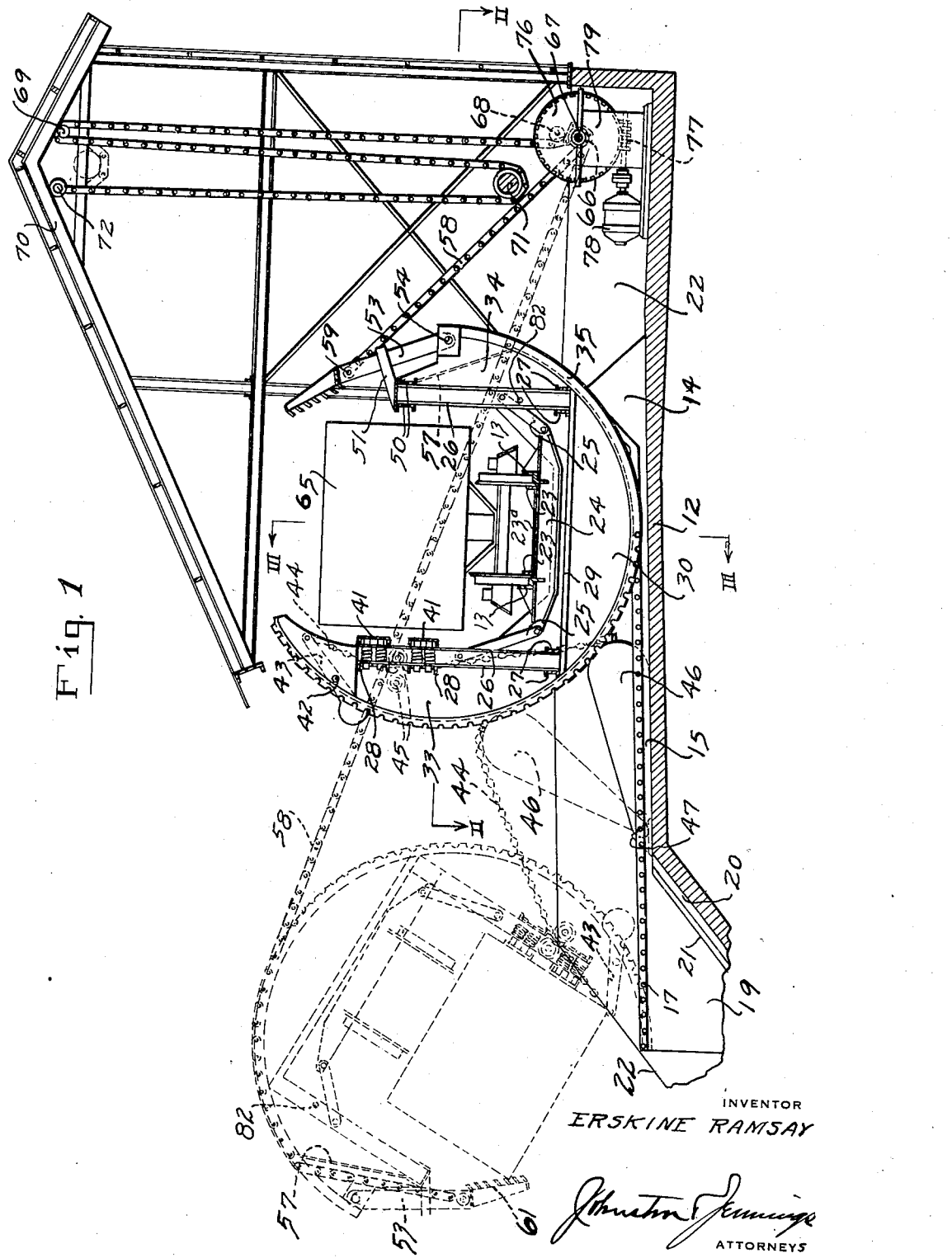
Fig. 1 represents a sectional view on the line I—I of Fig. 2 showing the dump in full lines in position to receive a railway car and in dotted lines in position assumed when dumping the car.
Figure 5:
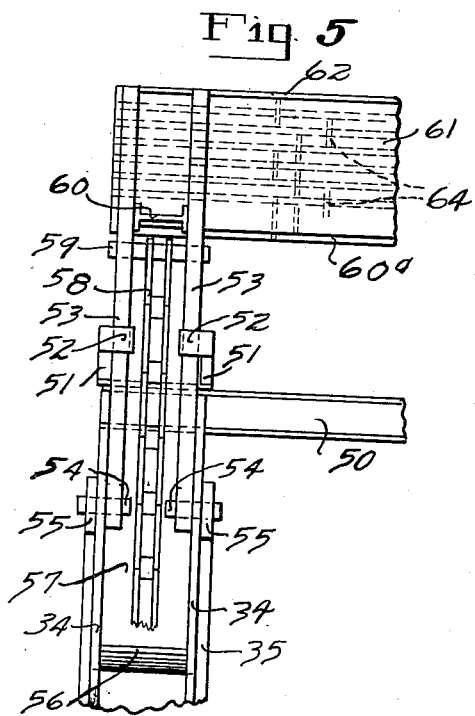
Fig. 5 is a side elevation of Fig. 4 with the hold-down elements broken away.

In the embodiment of my invention illustrated, I show a rolling dump designed and adapted for the reception and dumping of individual railway cars, but it will be understood that my invention is not limited to any particular size or number of cars but may well be adapted to various types and sizes of cars without modification of its essentially novel features of construction and operation.

I have shown the dump associated with a tipple having a floor 10 carrying the track rails 11 upon which the cars to be dumped approach and leave the dump. This floor 10 is formed with a dump well having a bottom 12 lowered sufficiently to bring the track 13 in the dump level with and in alignment with the tipple tracks 11 when the dump stands in initial position against stop shoulders 14 provided therefor in its track supports. These track supports, as shown, are formed by parallel concrete walls 15 which rise above the pit floor 12 and each is surmounted and armored by a channel 16 set astride the wall and having rack pins 17 mounted in its side flanges by welding the reduced pin shanks 18 in holes bored in such flanges. These channels 16 continue up along the bumper face of the shoulders 14 and over the extensions 19 of said walls which carry the track out over the dump chute 20, as will appear in Fig. 1, but the pins are arranged only from the track center to the end of extensions 19. The floor 12 and the tracks 15 pitch downwardly toward the dump chute 20, which carries protective armor 21. The side walls 22 of the dump pit continue over and down to form side walls for the chute 20.

The tracks 13 employed in the rotary dump comprise as typical elements a main outer Z-rail and an inner angle stop rail 23. These rail elements are mounted on a series of swinging I-beam supports 24 forming elements of the car cradle that are suspended at each end by a link 25 from a structural standard mounted vertically in the dump structure. Each standard comprises a spaced pair of reversely faced channels 26 and the standards along each side of the truck are connected along their bottom ends by two longitudinal channels 27 that extend the length of the dump. The standards on the left Fig. 1 are further braced together near their upper ends by two outside longitudinal channels 28. The channels 27 form the longitudinal structural members of a light strong bottom truss comprising cross channels 29, diagonal brace members 32 and end supporting pairs of web plate members 30 welded to the inner face of the riding rings 31. In each ring 31 on each side I mount a channel 26a and weld same to the adjacent inside channel 27. These channels 26a are welded in place between the adjacent side web plate members 33 or 34 and support the inner link 25 carrying the end cradle member 24.

Figure 7:
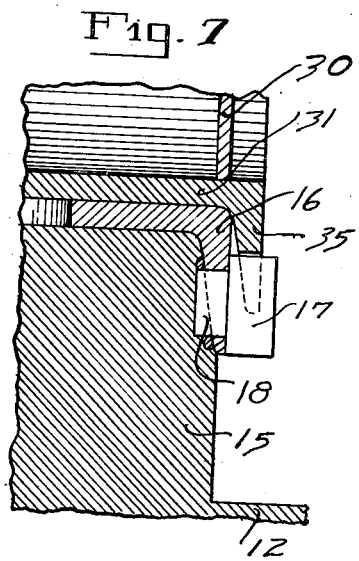
Fig. 7 is a partial sectional view through half of the cog track on which the dump rolls.

The riding rings 31 of the dump are formed by bent channel members with their flanges 35 (see Fig. 7) out-turned and notched along their edges to mesh with the track pins 17 to provide cogged or geared engagement between the dump and its respective tracks 16 which will prevent a long dump structure from cocking, twisting, or binding as it rolls back and forth on its tracks. The dumping structure is further braced vertically along each side by the provision of side members 33 and 34 of the web plates in the riding rings, which members are welded to the inner ring face and to the lower channels 27 and to upper channel 28 on the left and to outside upper channel 50 on the right of Fig. 1, all of which channels pass through suitable openings in the web plates and are welded thereto. The diagonal brace members 36 (see Fig. 3), which are welded below to the bottom channels 27 and above to the channels 28 or 50, form such members into structural trusses of light weight but considerable strength that are supported at each end by the riding rings 31.

Opposite each bracing channel 28 on the dumping side I mount a plate 37 and plunger bolts 38 are inserted through aligning openings in the channels 28 and plates 37. A spring 39 is mounted on each bolt and is seated at one end against the channel 28 and at the other end against a collar 40 secured by a pin on its respective plunger bolt 38 and disposed on the outward side of the plate 37. The bolts mounted in each pair of opposed elements 28 and 37 are at their inner ends welded to their respective bumper channel 41 and the arrangement described is such that when the weight of the car comes against the bumper channels it will cause the plunger bolts to yield, responsive to the compression of their springs 39 and form a cushion to stop and support the car when it swings laterally with the cradle as the dump rolls over.

Figure 6:
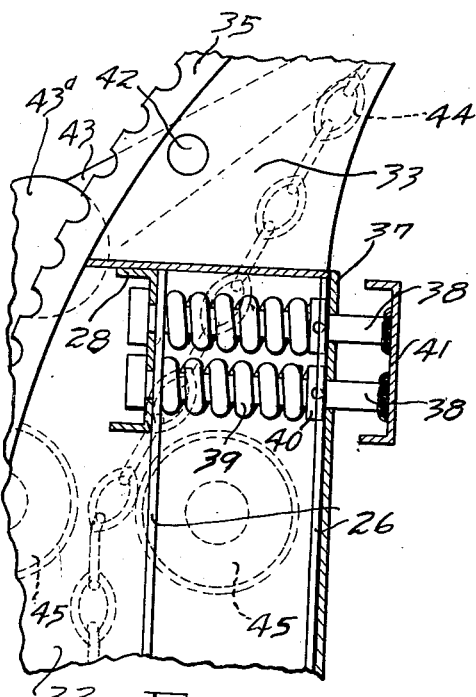
Fig. 6 is a detail cross sectional view through the spring bumper means in the dump taken in the line VI—VI of Fig. 3.

The web plate members 33 in each riding ring 31 above the level of the bumpers, carry a pivot pin 42 (Fig. 6) which overhangs to the outside of its respective dump ring and has pivotally mounted thereon a counterweighted lever 43, connected at its inner end by a chain 44, that passes down between guide rolls 45 journalled on the members 33, to the free end of its respective heavy counterweight 46, to which it is made fast. Each of these counterweights is pivoted to a bracket 47 secured to the dump pit floor 12 and the relation of parts is such that when the dump is in car receiving position, as shown in Fig. 1, the two counterweights 46 rest upon the floor 12 as a stop, and their chains 44 are held taut by the counterweight 43a on the outer end of each lever 43. But as the dump rolls toward its dumping position, shown in dotted lines Fig. 1, these chains 44 pull against the weights 46 until they rise to the dotted line position (Fig. 1). The pull thus from these weights on the chains to check the dump draws both arms 43 inwardly and downwardly against the adjacent side edge of the car on its dumping side to assist in holding it in position in the dump. In full dumping position the counterweights 43a on the hold-down arms 43 are in position to coact with the pull from the counterweights 46, whereas in initial position these counterweights work in opposition.

Figure 4:
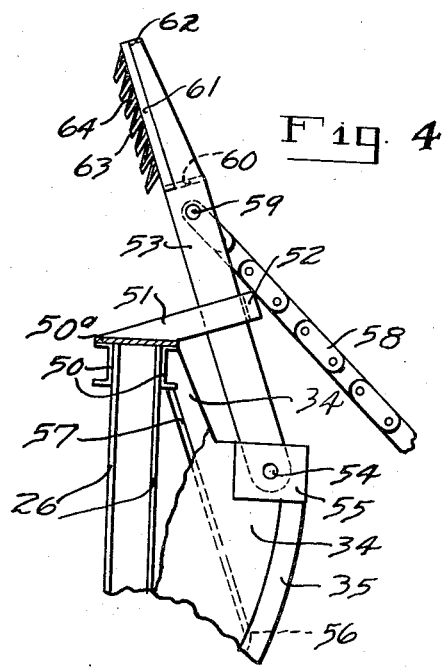
Fig. 4 is a detail view in end elevation of one of the car gripping hold-downs.

The right-hand side of the dumping frame, as viewed in Fig. 1, shows the riding rings terminating below the upper level of the right hand standards 26 which are shorter than the standards 26 on the left hand side of the dump. These shorter standards are incorporated in a truss in the manner already described for the left hand standards (Fig. 1) with the longitudinal top members consisting of the channels 50 and a top plate 50a. As seen in Fig. 4 I mount on top of each such plate 50a, within each riding ring 31, a pair of guide bars 51 with their free ends inturned to form stops 52 for a pair of arms 53, each pivotally mounted by its respective stud pivot pin 54 in the adjacent side web plate members 34 and a mounting plate 55 attached to such web members. Enough of the web portion of each riding ring channel 31 is cut from its side flanges and bent inwardly from the point 56 (Fig. 4) to form a diagonal brace 57 leading up to the adjacent channel 50. This leaves the riding rings open above the point of bending 56 of the ring webs so that a chain 58 attached centrally to a pin 59, mounted in each ring near the upper ends of its pair of arms 53, may swing down clearing its respective stops 51 and pins 54 and, in certain positions of the dump, come to rest on channel 50 and web 57 of its riding ring (see the dotted line position of chain 58 in Fig. 1). The arms 53 in each riding ring 31 extend above the adjacent pin 59 and are cross braced by a bar 60 mounted between them. Both pairs of arms 53 are connected together by a longitudinal plate 60a extending the length of the dump, and are also connected by the plates 61 and 62. The plate 61 has welded, or otherwise made fast thereto, a series of downwardly inclined strips 63 which are braced at intervals by gussets 64 and extend the full length of the dump. These form detents which are adapted to engage the near side of the car 65 in the dump as a hold-down means.

I provide two chains running from the pairs of arms 53 on each riding ring about a sprocket 66 on a shaft 67, the chains passing around the sprockets 66 and under idlers 68 and thence about idlers 69, each suitably mounted in the top dump structure 70, and thence in a loop under a counterweighting roll 71 and back up to a suitable anchorage 72 at the top of the dump structure. This arrangement is common to both ends of the dump and the idlers 68 are suitably mounted by means of brackets 73 on the stands 74 which support the end bearings 75 for the shaft 67. Near its center the shaft 67 carries a worm wheel 76 meshing a worm 77 on the drive shaft of a reversible electric motor 78. The bearings 79 house the shaft 67 at its center, the motor shaft and the worm drive. The counter-weighting roll 71 carries sprockets 80 at its ends adapted to mesh with the chains 58.

The worm drive to the shaft 67 constitutes the brake which, through chains 58, controls the rolling motion of the dump. Assuming the dump in initial position and a car 65 in the dump, the dumping operation proceeds as follows: Due to the downward pitch of the dump tracks on which the riding rings rest, the dump stands unbalanced to the left (Fig. 1) and but for the worm drive brake would start at once rolling to the left. The motor is thereupon put in motion to drive the worm wheel 66 clockwise, thereby paying off the chains 58 evenly at each end of the dump and reducing the amount of chain in the bight in which the roll 71 is engaged. This releases the dump which starts rolling with a cog geared mesh with its track pins 17 and as it turns the weight of the car becomes more unbalanced to the left in the dump, causing its cradle to swing to the left until the side of the car engages the spring bumper channels 41 and its upper edge stands close to the overhanging ends of the riding rings. As the dump rolls its chains 58 swing downwardly until they move past dead center (Fig. 4) with reference to the pivot pins 54 for arms 53, when they pull the said arms down until one of their strips 63 engages the adjacent right hand edge of the car as a hold-down means. Thereafter the pull of the load applied to the chains 58 is exerted to hold these grip members to their work. As the dump rolls the chains 44 at each end connecting the hold-down arm 43 with the weights 46, commence to tighten and pull on said weights 46 to lift them. The resistance of the weights, which is great at first, pulls the hold-down arms 43 against the left hand side edge of the car to assist in holding it against slipping off the bumper channels 41. The dump continues to roll until its rings pass out over the dump chute 20 when the car becomes sufficiently inverted to discharge all of its contents. Thereupon, the motor 78 is reversed and the chains 58 are used to roll the dump up the incline to initial position. As the dump approaches initial position, the weights 46 come to rest on the floor 12 freeing the counter-weights 43a on the arms 43 to lift them clear of the car. At the same time the chains 58 swing above dead center position with reference to pins 54 (Fig. 4) and act to pull the hold-down elements 53, 63 on the right clear of the car. When the dump is righted its cradle will swing or shift back to initial center position in the dump when the empty car can be withdrawn in either direction from the dump.

It will be noted by reference to Fig. 1 that the cradle supporting links 25 on the right hand side are shorter than those on the left. The purpose of this arrangement is to give the load on the cradle as the dump rights itself a little more power to pull the cradle towards the right and thus insure its return to center position in alignment with the tracks 11. A stop pin 82 is provided to limit the shift of the cradle to the right and the shorter links on the right will hold it in this position until the rails 13 engage the stationary stops 81, thus insuring that the moving dump rails 13 and the stationary rails 11 will always come automatically into exact register, when the dump has returned to initial position. In the dumping operation the motor 78 only acts as a release for the worm brake, and on the return travel of the dump it has only to roll the empty car and dump back to initial position.

It is important to note, by reference more particularly to Fig. 1, that when the loaded car stands upright in the dump its center of gravity is materially above the center of rotation of the dump and as the dump turns counter-clockwise this weight becomes unbalanced to the left and both assists and accelerates its rolling motion toward dumping position, subject to control of its motor worm drive and takes all driving duty off this motor in respect of this movement to dump. By noting the dotted line position of the inverted car in the dump, it will be seen that the running gear, representing the greater portion of the weight of the car, and also the cradle will stand above and to the right of the axis of rotation of the dump when the car is inverted. This excess weight unbalances the dump to the right and thus assists in starting and accelerating its return movement to initial position, thereby reducing the duty on the motor 78 to effect the return of the dump. Thus, a relatively small motor can exert a powerful and effective control at all times of the dump, and the light truss structure of the dump, both in its horizontal and vertical members, gives it both a light, stiff and durable frame work.

The mounting of the car in a cradle or laterally shiftable support reduces the angular or cocking strain upon the car mounting, and lets the latter swing or shift and come to rest naturally and easily against the spring bumper plates 41 on the strongly braced side of the dump.

The designing of the dump to permit the dump cradle to swing or shift laterally provides an excess side clearance for the cars to be dumped which enables the dump to accommodate different sizes and designs of cars and yet cause all to come quickly and solidly to rest against the spring cushion plates 41 as the dump starts to roll. It is further to be noted that the spring cushion plates 41 being disposed at different levels and independently spring mounted, will readily adapt themselves to different side contours of cars as the latter shift over and engage them.

It will be understood when I refer to a swinging cradle that such term is inclusive of any car receiver which is capable of a lateral shifting movement back and forth in the dump which will permit the car to shift over against its cushion supports in being dumped, and then to shift back to initial position when the dump is righted, thereby bringing the tracks in the dump into register with the stationary tracks 11. It will be understood that the hold-down members 63 may be of any suitable character to enable them to readily grip and engage cars of any particular design, width, height and contour.

In the preferred arrangement the inside track elements 23 are formed as side flanges of a longitudinal floor plate 23a extending the length of the cradle.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. A rolling car dump, comprising a car receiving frame, riding ring elements carrying the frame, tracks upon which the ring elements ride to invert a car in the dump, motor driven mechanism to control the rolling movements of the dump, and hold-down means for a car in the dump connected to, and adapted to be automatically and positively applied and released by, the dump control mechanism.

2. A rolling car dump, comprising a car receiving frame, riding ring elements carrying the frame, tracks upon which the ring elements ride to invert a car in the dump, hold-down means for a car in the dump, motor driven mechanism directly connected to said hold-down means for controlling the rolling movements of the dump, and means to apply and release said hold-down means automatically responsive to the rolling motion of the dump.

3. A rolling dump according to claim 2, in which hold-down elements are disposed on both sides of the car in the dump and their control means comprise counter-weight means to operate the hold-down elements on one side of the dump, and means responsive to the motor driven mechanism to operate the hold-down means on the other side of the dump, both hold-down control mechanisms being adapted automatically to release the car as it resumes upright position.

4. A rolling dump, comprising an elongated railway car receiving frame, riding ring elements carrying said frame, inclined transversely disposed tracks upon which said ring elements ride to invert a car in the dump, chain control mechanism to operate the dump comprising chains, each connected to an anchorage at one end and at the other end to the periphery of a dump ring element, a common pulley and counter-weight means working in a bight in said chains to maintain equalized tension on said chains, a common sprocket drive for all chains, and a motor driven worm gear transmission for driving said sprocket drive and adapted to serve as a common brake means for all chains.

5. A rolling dump, comprising a car receiving frame, riding ring elements carrying said frame, inclined transversely disposed tracks upon which said ring elements ride to invert a car in the dump, motor driven chain control mechanism to operate the dump, a car hold-down means pivoted to each riding ring to which hold-down means said chain control mechanism is attached in position for the chains to move below dead center relation to the axis of said hold-down means and apply said hold-down means during the initial movement of the dump, and to move above such dead center relation position and release the hold-down means as the dump completes its return travel after dumping.

6. A rolling dump, comprising a frame having transverse riding ring elements, tracks upon which the ring elements ride, a swinging cradle mounted in the frame and adapted to receive and support the car to be dumped, swinging supports for the cradle, those on the dumping side being longer and disposed at a lesser angle to the vertical than those on the other side, to insure the automatic gravitating return of the cradle to initial car receiving and discharging position, hold-down means to retain the car in the dump when inverted, and means to control the rolling movements of the dump.

ERSKINE RAMSAY.